(12) United States Patent
Harada

(10) Patent No.: US 8,181,439 B2
(45) Date of Patent: May 22, 2012

(54) INTAKE AIR HEATING SYSTEM OF COMBINED CYCLE PLANT

(75) Inventor: Shoichi Harada, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/036,798

(22) Filed: Feb. 28, 2011

(65) Prior Publication Data

US 2011/0146225 A1 Jun. 23, 2011

Related U.S. Application Data

(63) Continuation of application No. 12/248,330, filed on Oct. 9, 2008, now Pat. No. 8,001,760.

(51) Int. Cl.
*F02C 6/00* (2006.01)
(52) U.S. Cl. .................................... 60/39.182
(58) Field of Classification Search ............... 60/39.182, 60/39.511, 728
See application file for complete search history.

(56) References Cited

U.S. PATENT DOCUMENTS

| | | | |
|---|---|---|---|
| 3,150,487 A | 9/1964 | Mangan et al. | |
| 4,516,403 A | 5/1985 | Tanaka | |
| 4,936,089 A | 6/1990 | Komiyama et al. | |
| 5,457,951 A * | 10/1995 | Johnson et al. | 60/780 |
| 5,623,822 A * | 4/1997 | Schuetzenduebel et al. | 60/39.182 |
| 5,884,470 A * | 3/1999 | Frutschi | 60/783 |
| 6,233,917 B1 | 5/2001 | Bahr et al. | |
| 6,338,239 B1 | 1/2002 | Hirata et al. | |
| 6,470,686 B2 | 10/2002 | Pierson | |
| 2001/0027642 A1 | 10/2001 | Tsuji | |
| 2003/0079461 A1 | 5/2003 | Mandai et al. | |
| 2006/0087294 A1 | 4/2006 | Kataoka et al. | |

FOREIGN PATENT DOCUMENTS

| | | |
|---|---|---|
| JP | 62-90949 U | 6/1987 |
| JP | 1-117903 A | 5/1989 |
| JP | 2-115602 A | 4/1990 |
| JP | 4-48921 B2 | 8/1992 |
| JP | 6-159606 A | 6/1994 |

(Continued)

OTHER PUBLICATIONS

Japanese Office Action dated Apr. 26, 2011, issued in corresponding Japanese Patent Application No. 2006-143476.

(Continued)

*Primary Examiner* — Louis Casaregola
*Assistant Examiner* — Phutthiwat Wongwian
(74) *Attorney, Agent, or Firm* — Westerman, Hattori, Daniels & Adrian, LLP

(57) ABSTRACT

A gas turbine is driven by a combustion gas produced when BFG compressed by a gas compressor and air compressed by a compressor are burned in a combustor. Steam is generated from a waste heat boiler by utilization of heat of an exhaust gas from the gas turbine, and a steam turbine is driven by this steam. An electric generator generates electricity upon driving of the turbines. A condensing heat exchanger is disposed in an air intake duct, and part of steam from the waste heat boiler flows through the heat exchanger to heat intake air. The amount of steam that flows through the heat exchanger is adjusted by adjusting the degree of opening of a steam control valve by a control device. By so doing, the ignition performance of the gas turbine in a BFG-fired gas turbine combined cycle plant is enhanced even in an extremely cold district.

5 Claims, 1 Drawing Sheet

FOREIGN PATENT DOCUMENTS

| | | |
|---|---|---|
| JP | 9-317496 A | 12/1997 |
| JP | 10-26301 A | 1/1998 |
| JP | 2899247 B2 | 6/1999 |
| JP | 2000-097046 A | 4/2000 |
| JP | 2003-161164 A | 6/2003 |
| JP | 2003-239760 A | 8/2003 |

OTHER PUBLICATIONS

U.S. Office Action (Notice of Allowance) dated Mar. 14, 2011, issued in related U.S. Appl. No. 12/248,330.

* cited by examiner

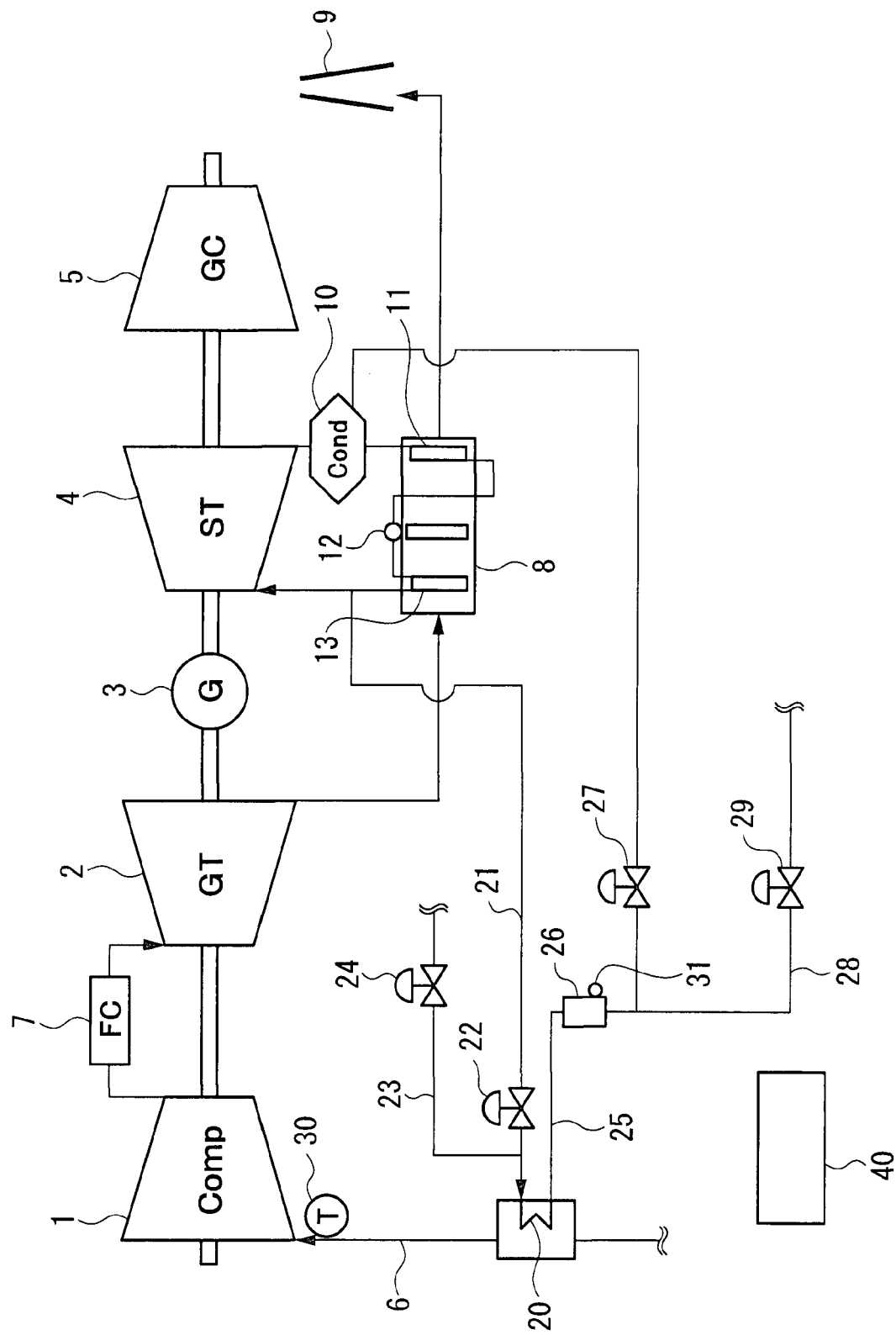

INTAKE AIR HEATING SYSTEM OF COMBINED CYCLE PLANT

CROSS-REFERENCE TO RELATED APPLICATIONS

This application is a Continuation application of application Ser. No. 12/248,330, filed Oct. 9, 2008, the entire disclosure of which is hereby incorporated by reference.

BACKGROUND OF THE INVENTION

1. Field of the Invention

This invention relates to an intake air heating system of a combined cycle plant, which is designed, particularly, to be operable even in an extremely cold district.

2. Description of the Related Art

In an iron making process, a large amount of BFG (blast furnace gas) is formed in a blast furnace. In recent years, a BFG-fired combined cycle plant, which uses this BFG as a fuel for a gas turbine, has attracted attention from the viewpoints of environmental protection and effective utilization of energy.

BFG is in a special fuel state such that it has a lower calorific value and contains larger amounts of impurities in the fuel, than a natural gas which is usually used as a gas turbine fuel.

In the BFG-fired combined cycle plant, therefore, BFG is used as a fuel, with various ideas including, for example, the idea that BFG is compressed in a gas compressor directly connected to a gas turbine shaft, and then burned in a combustor.

The installation of such a BFG-fired combined cycle plant in an extremely cold district as well as in a warm region is under consideration.

In installing the BFG-fired combined cycle plant in the extremely cold district, the following problems occur, because the calorific value of BFG is low and the air temperature of the atmosphere taken in is very low (e.g., −30° C.)

(1) The ignition performance of the gas turbine deteriorates.

That is, under extremely low atmospheric temperature (e.g., −30° C.) conditions, it becomes difficult to ignite the gas turbine.

(2) Combustion vibrations in a no-load state are apt to occur.

That is, under extremely low atmospheric temperature (e.g., −30° C.) conditions, combustion vibrations tend to occur at an increased turbine speed or in a state close to a no-load state. At the increased turbine speed or in a low-load state, therefore, it becomes difficult to make an adjustment so that combustion vibrations do not occur.

(3) Freezing or icing of moisture in intake air at the inlet of the compressor occurs.

If the temperature of the air taken in is low, moisture in the low temperature air has a possibility to freeze or ice at the inlet of the compressor.

Thus, an anti-icing technology, which bleeds part of air in the casing of the compressor, and incorporates the bleed air into intake air to heat the intake air, has already been developed. With this technology, however, air within the casing of the compressor is bled. Thus, combustibility is adversely affected, and a large amount of air cannot be bled, so that the range of a rise in the intake air temperature has been restricted.

Even if such a technology is applied to the BFG-fired combined cycle plant installed in the extremely cold district, it is impossible to ensure the amount of heating bleed air required for heating air at an extremely low temperature (e.g., −30° C.), because of limitations on the amount of bleed air.

(4) Surging is apt to occur in the air compressor under load in the vicinity of rated load.

That is, under extremely low atmospheric temperature (e.g., −30° C.) conditions, surging is apt to occur under constant load. Thus, the compressor is operated in a limited manner so as not to cause surging. This requires limitations on load, thereby making operation under heavy load difficult.

SUMMARY OF THE INVENTION

The present invention has been accomplished in light of the above-described conventional technologies. It is an object of the invention to provide an intake air heating system of a combined cycle plant using a gas of low calorific value, for example, BFG, as a fuel, the intake air heating system being capable of effectively heating intake air at an extremely low temperature, without adversely affecting combustibility.

A feature of the present invention for solving the above-mentioned problems is an intake air heating system of a combined cycle plant including a compressor for compressing intake air taken in via an air intake duct, a combustor for burning compressed air compressed by the compressor and a fuel gas, a gas turbine driven by a combustion gas obtained by combustion in the combustor, a waste heat boiler for recovering heat in an exhaust gas discharged from the gas turbine to generate steam, a steam turbine driven by steam generated by the waste heat boiler, and a condenser for condensing exhaust steam discharged from the steam turbine into water, the intake air heating system comprising:

a heat exchanger disposed in the air intake duct; and a heating medium flow-through structure for flowing steam, which has been generated in the waste heat boiler, through the heat exchanger, and also returning water, which has been discharged from the heat exchanger, to the condenser.

Another feature of the present invention is an intake air heating system of a combined cycle plant including a compressor for compressing intake air taken in via an air intake duct, a gas compressor for compressing a fuel gas, a combustor for burning compressed air compressed by the compressor and the fuel gas compressed by the gas compressor, a gas turbine driven by a combustion gas obtained by combustion in the combustor, a waste heat boiler for recovering heat in an exhaust gas discharged from the gas turbine to generate steam, a steam turbine driven by steam generated by the waste heat boiler, and a condenser for condensing exhaust steam discharged from the steam turbine into water, the intake air heating system comprising:

a heat exchanger disposed in the air intake duct; and a heating medium flow-through structure for flowing steam, which has been generated in the waste heat boiler, through the heat exchanger, and also returning water, which has been discharged from the heat exchanger, to the condenser.

Another feature of the present invention is an intake air heating system of a combined cycle plant including a compressor for compressing intake air taken in via an air intake duct, a gas compressor for compressing a fuel gas, a combustor for burning compressed air compressed by the compressor and the fuel gas compressed by the gas compressor, a gas turbine driven by a combustion gas obtained by combustion in the combustor, a waste heat boiler for recovering heat in an exhaust gas discharged from the gas turbine to generate steam, a steam turbine driven by steam generated by the waste heat boiler, and a condenser for condensing exhaust steam discharged from the steam turbine into water, the intake air heating system comprising:

a heat exchanger disposed in the air intake duct;

a steam supply pipe for supplying steam generated in the waste heat boiler to the heat exchanger;

a steam control valve interposed in the steam supply pipe;

a return pipe for returning water discharged from the heat exchanger to the condenser;

a temperature detector for detecting a temperature of intake air taken into the compressor; and a control device for adjusting a degree of opening of the steam control valve so that the temperature detected by the temperature detector becomes a preset temperature.

Another feature of the present invention is an intake air heating system of a combined cycle plant including a compressor for compressing intake air taken in via an air intake duct, a gas compressor for compressing a fuel gas, a combustor for burning compressed air compressed by the compressor and the fuel gas compressed by the gas compressor, a gas turbine driven by a combustion gas obtained by combustion in the combustor, a waste heat boiler for recovering heat in an exhaust gas discharged from the gas turbine to generate steam, a steam turbine driven by steam generated by the waste heat boiler, and a condenser for condensing exhaust steam discharged from the steam turbine into water, the intake air heating system comprising:

a heat exchanger disposed in the air intake duct;

a steam supply pipe for supplying steam generated in the waste heat boiler to the heat exchanger;

a steam control valve interposed in the steam supply pipe;

a return pipe for returning water discharged from the heat exchanger to the condenser;

a drain tank interposed in the return pipe, and a water level control valve which is disposed in the return pipe nearer the condenser than is the drain tank;

a temperature detector for detecting a temperature of intake air taken into the compressor;

a water level detector for detecting a water level within the drain tank; and a control device for adjusting a degree of opening of the steam control valve so that the temperature detected by the temperature detector becomes a preset temperature, and also adjusting a degree of opening of the water level control valve so that the water level detected by the water level detector becomes a set water level which has been set beforehand.

Another feature of the present invention is the intake air heating system characterized in that the fuel gas is a low-calorie fuel such as BFG (blast furnace gas).

According to the present invention, the heat exchanger is disposed in the air intake duct, and part of steam generated by the waste heat boiler is flowed through the heat exchanger, whereby intake air is heated. Thus, even extremely low temperature intake air can be effectively heated.

Since the effective heating of intake air can be achieved as described above, an improvement in the ignition performance of the gas turbine (ease of ignition), the prevention of combustion vibrations, and the prevention of icing and surging can be realized.

Hence, it becomes possible to operate the combined cycle plant, which utilizes a fuel gas of low calorific value, such as BFG, even in an extremely cold district.

Furthermore, only part of steam from the waste heat boiler is utilized for the heating of intake air. Thus, the system of the present invention does not adversely affect the combustion performance of the gas turbine, in comparison with an anti-icing system using gas turbine casing air.

BRIEF DESCRIPTION OF THE DRAWINGS

FIG. 1 is a system diagram showing a combined cycle plant according to an embodiment of the present invention.

DESCRIPTION OF THE PREFERRED EMBODIMENTS

The best mode for carrying out the present invention will be described in detail based on its embodiment.

FIG. 1 is a system diagram showing a BFG-fired combined cycle according to an embodiment of the present invention.

In the present embodiment, a compressor 1, a gas turbine 2, an electric generator 3, a steam turbine 4, and a gas compressor 5 are provided on the same rotating shaft.

Compressed air, obtained when intake air taken in via an air intake duct 6 is compressed by the compressor 1, and BFG compressed by the gas compressor 5 are burned in a combustor 7. The gas turbine 2 is driven by a combustion gas formed by this combustion. An exhaust gas discharged from the gas turbine 2 has its heat recovered by a waste heat boiler 8, and steam is generated in the waste heat boiler 8. The exhaust gas having the heat recovered by the waste heat boiler 8 is discharged from a smokestack 9.

Steam generated by the waste heat boiler 8 is sent to the steam turbine 4 to drive the steam turbine 4. Exhaust steam discharged from the steam turbine 4 is cooled in a condenser 10 for condensation. The resulting condensate water receives heat from the waste heat boiler 8 to become steam again, and the steam is sent to the steam turbine 4. The numeral 11 denotes an economizer, the numeral 12 denotes an evaporator, and the numeral 13 denotes a superheater.

The foregoing explanations are the same as those for the conventional BFG-fired combined cycle plant.

In the present embodiment, a heat exchanger 20 is further provided in the air intake duct 6, concretely, in a portion of the air intake duct 6 where an air intake filter is provided (a portion downstream of the air intake filter).

Steam (own boiler steam) generated in the waste heat boiler 8 is supplied to the heat exchanger 20 via a steam supply pipe 21. The supplied steam flows through the interior of the heat exchanger 20 to heat intake air flowing through the air duct 6. The heat exchanger 20 is a non-contact heat exchanger where steam and intake air do not directly contact.

A steam control valve 22 is interposed in the steam supply pipe 21.

When the own boiler steam is not generated, i.e., when the steam from the waste heat boiler 8 is not generated, auxiliary steam is supplied from an auxiliary steam source (not shown) to the heat exchanger 20 via an auxiliary steam supply pipe 23.

An auxiliary steam control valve 24 is interposed in the auxiliary steam supply pipe 23.

In the present embodiment, steam supplied to the heat exchanger 20 flows within the heat exchanger 20, whereby the steam becomes condensed and turns into water. That is, the heat exchanger 20 functions as a condensing heat exchanger, which also utilizes the heat of condensation possessed by steam to heat intake air. Thus, its heating efficiency is high.

If the own boiler steam is supplied to the heat exchanger 20, the resulting condensate water upon passage through the heat exchanger 20 is returned to the condenser 10 via a return pipe 25.

In the return pipe 25, a drain tank 26 is interposed on the side of the heat exchanger 20, and a water level control valve (return side) 27 is interposed on the side of the condenser 10.

If the auxiliary steam is supplied to the heat exchanger 20, the resulting condensate water upon passage through the heat exchanger 20 is discharged to the outside via an atmospheric escape pipe 28.

A water level control valve (atmospheric escape side) 29 is interposed in the atmospheric escape pipe 28.

In the air intake duct 6, a temperature detector 30 for detecting the temperature of intake air taken into the compressor 1 is provided. The detected temperature detected by the temperature detector 30 is sent to a control device 40.

The drain tank 26 is equipped with a water level detector 31 for detecting the water level of water accumulated in the drain tank 26. The detected water level detected by the water level detector 31 is sent to the control device 40.

The control device 40 controls the opening and closing of each of the valves 22, 24, 27 and 29, and the degree of opening of each of these valves. A control technique by the control device 40 will be described next.

<Heating of Intake Air by Own Boiler Steam>

In this case, the control device 40 exercises valve control as described below.

First, the auxiliary steam control valve 24 and the water level control valve (atmospheric escape side) 29 are fully closed.

In this state, the degree of opening of the steam control valve 22 is adjusted so that the temperature of intake air detected by the temperature detector 30 becomes a temperature set beforehand (e.g., 5° C.). By so adjusting the degree of opening of the steam control valve 22 to adjust the amount of steam flowed into the heat exchanger 20, the degree of heating the intake air is adjusted. As a result, the temperature of air taken into the compressor 1 can be effectively heated to the set temperature.

In this case, the heat exchanger 20 functions as the condensing heat exchanger in accordance with the temperature balance between the temperature of intake air and the temperature of steam.

Furthermore, it is advisable to detect the pressure of steam supplied, and take this pressure as well into consideration, in addition to the detected temperature of intake air detected by the temperature detector 30, thereby adjusting the degree of opening of the steam control valve 22.

That is, the adjustment of the degree of opening of the steam control valve 22 based on the temperature of intake air is used as a basis for control. In addition, the following control may also be exercised: If the pressure of steam is high, the degree of opening of the steam control valve 22 is rendered low. If the pressure of steam is low, the degree of opening of the steam control valve 22 is rendered high. Effecting such types of control together, the degree of opening of the steam control valve 22 may be adjusted.

Besides, the degree of opening of the water level control valve 27 is adjusted so that the detected water level within the drain tank 26 detected by the water level detector 31 becomes a set water level which has been set beforehand. By so adjusting the water level, only water returns to the condenser 10, and steam can be prevented from returning there.

<Heating of Intake Air by Auxiliary Steam>

In this case, the control device 40 exercises valve control as described below.

First, the steam control valve 22 and the water level control valve 27 are fully closed.

In this state, the degree of opening of the auxiliary steam control valve 24 is adjusted so that the temperature of intake air detected by the temperature detector 30 becomes a temperature set beforehand (e.g., 5° C.). By so adjusting the degree of opening of the auxiliary steam control valve 24 to adjust the amount of steam flowed into the heat exchanger 20, the degree of heating the intake air is adjusted. As a result, the temperature of air taken into the compressor 1 can be effectively heated to the set temperature.

In this case, the heat exchanger 20 functions as the condensing heat exchanger in accordance with the temperature balance between the temperature of intake air and the temperature of steam.

Furthermore, it is advisable to detect the pressure of steam supplied, and take this pressure as well into consideration, in addition to the detected temperature of intake air detected by the temperature detector 30, thereby adjusting the degree of opening of the auxiliary steam control valve 24.

That is, the adjustment of the degree of opening of the auxiliary steam control valve 24 based on the temperature of intake air is used as a basis for control. In addition, the following control may also be exercised: If the pressure of steam is high, the degree of opening of the auxiliary steam control valve 24 is rendered low. If the pressure of steam is low, the degree of opening of the auxiliary steam control valve 24 is rendered high. Effecting such types of control together, the degree of opening of the auxiliary steam control valve 24 may be adjusted.

Besides, the degree of opening of the water level control valve 29 is adjusted so that the detected water level within the drain tank 26 detected by the water level detector 31 becomes a set water level which has been set beforehand.

The present invention can be applied not only to a BFG-fired combined cycle plant, but also to a combined cycle plant using a gas of low calorific value as a fuel.

What is claimed is:

1. A combined cycle plant including
    a compressor for compressing intake air taken in via an air intake duct,
    a combustor for burning compressed air compressed by the compressor and a fuel gas,
    a gas turbine driven by a combustion gas obtained by combustion in the combustor,
    a waste heat boiler for recovering heat in an exhaust gas discharged from the gas turbine to generate steam,
    a steam turbine driven by steam generated by the waste heat boiler, and
    a condenser for condensing exhaust steam discharged from the steam turbine into water,
    a heat exchanger disposed in the air intake duct; and
    a heating medium flow-through structure for branching part of steam, which has been generated in a superheater of the waste heat boiler and is sent to the steam turbine, flowing the part of the steam through the heat exchanger, and also returning water, which has been discharged from the heat exchanger, to the condenser.

2. A combined cycle plant including
a compressor for compressing intake air taken in via an air intake duct,
a combustor for burning compressed air compressed by the compressor and a fuel gas
a gas turbine driven by a combustion gas obtained by combustion in the combustor,
a waste heat boiler for recovering heat in an exhaust gas discharged from the gas turbine to generate steam,
a steam turbine driven by steam generated by the waste heat boiler, and
a condenser for condensing exhaust steam discharged from the steam turbine into water,
a heat exchanger disposed in the air intake duct;
a steam supply pipe for branching part of steam, which has been generated in a superheater of the waste heat boiler and is sent to the steam turbine, and supplying the part of steam to the heat exchanger;
a steam control valve interposed in the steam supply pipe;
a return pipe for returning water discharged from the heat exchanger to the condenser;
a temperature detector for detecting a temperature of intake air taken into the compressor; and
a control device for adjusting a degree of opening of the steam control valve so that the temperature detected by the temperature detector becomes a preset temperature.

3. The combined cycle plant according to any one of claims 1 and 2, further comprising a gas compressor which compresses the fuel gas, wherein the fuel gas is BFG (blast furnace gas).

4. The combined cycle plant according to any one of claims 1 and 2, wherein said heat exchanger is a condensing heat exchanger.

5. A combined cycle plant according to claim 3, wherein said heat exchanger is a condensing heat exchanger.

* * * * *